US012305534B2

(12) United States Patent
Seo

(10) Patent No.: US 12,305,534 B2
(45) Date of Patent: May 20, 2025

(54) BLADE, ROTARY MACHINE AND GAS TURBINE INCLUDING SAME, AND BLADE INSTALLATION METHOD

(71) Applicant: DOOSAN ENERBILITY CO., LTD., Changwon (KR)

(72) Inventor: Min Soo Seo, Changwon (KR)

(73) Assignee: DOOSAN ENERBILITY CO., LTD., Changwon (KR)

(*) Notice: Subject to any disclaimer, the term of this patent is extended or adjusted under 35 U.S.C. 154(b) by 0 days.

(21) Appl. No.: 18/450,501

(22) Filed: Aug. 16, 2023

(65) Prior Publication Data

US 2024/0093614 A1 Mar. 21, 2024

(30) Foreign Application Priority Data

Sep. 15, 2022 (KR) ........................ 10-2022-0116646

(51) Int. Cl.
*F01D 5/30* (2006.01)
*F01D 5/14* (2006.01)

(52) U.S. Cl.
CPC ............. *F01D 5/303* (2013.01); *F01D 5/141* (2013.01); *F01D 5/147* (2013.01); *F01D 5/3038* (2013.01); *F05D 2230/60* (2013.01); *F05D 2240/80* (2013.01)

(58) Field of Classification Search
CPC ...... F01D 5/303; F01D 5/3038; F01D 5/3023; F01D 5/3046; F01D 5/143; F01D 5/14; F01D 5/141; F01D 5/147; F04D 29/384; F04D 29/388; F04D 29/322; F04D 29/34; F04D 29/36; F05D 2240/80; F05D 2240/81
See application file for complete search history.

(56) References Cited

U.S. PATENT DOCUMENTS

| | | | | |
|---|---|---|---|---|
| 3,042,368 | A | 7/1962 | Cook | |
| 4,465,432 | A | 8/1984 | Mandet | |
| 6,152,698 | A * | 11/2000 | Gregg | F01D 5/3038 29/889.22 |
| 9,175,572 | B2 | 11/2015 | McMurray | |
| 10,584,720 | B2 | 3/2020 | Onfray | |
| 2013/0272885 | A1 | 10/2013 | McMurray | |

(Continued)

FOREIGN PATENT DOCUMENTS

| | | | |
|---|---|---|---|
| FR | 3082878 | A1 * | 12/2019 |
| GB | 2416568 | A * | 2/2006 |

(Continued)

OTHER PUBLICATIONS

English machine translation of FR-3082878-A1, Mar. 23, 2024.*
EP EESR, dated Feb. 12, 2024.

*Primary Examiner* — Christopher Verdier
(74) *Attorney, Agent, or Firm* — Harvest IP Law, LLP

(57) ABSTRACT

A blade for a rotary machine includes an airfoil having a leading edge and a trailing edge, a root part located at a lower portion of the airfoil, and a platform part located between the root part and the airfoil and having a first side surface and a second side surface spaced apart from each other. The first side surface includes a first reference surface and a first inclined surface formed inclined to the first reference surface, and the second side surface includes a second reference surface and a second inclined surface formed inclined to the second reference surface.

9 Claims, 9 Drawing Sheets

(56) References Cited

U.S. PATENT DOCUMENTS

| | | | | |
|---|---|---|---|---|
| 2017/0016336 | A1 * | 1/2017 | de Lazzer | F04D 29/322 |
| 2019/0153881 | A1 * | 5/2019 | Seo | F01D 5/3007 |

FOREIGN PATENT DOCUMENTS

| | | | |
|---|---|---|---|
| JP | 55-078103 | A | 6/1980 |
| JP | 11-006499 | A | 1/1999 |
| JP | 2006-002609 | A | 1/2006 |
| JP | 4673732 | B2 | 4/2011 |
| JP | 6258483 | B2 | 12/2017 |
| KR | 10-2170572 | B1 | 10/2020 |

* cited by examiner

BLADE, ROTARY MACHINE AND GAS TURBINE INCLUDING SAME, AND BLADE INSTALLATION METHOD

CROSS REFERENCE TO RELATED APPLICATION

The present application claims priority to Korean Patent Application No. 10-2022-0116646, filed on Sep. 15, 2022, the entire contents of which are incorporated herein for all purposes by this reference.

BACKGROUND OF THE INVENTION

1. Field of the Invention

The present disclosure relates to a blade, a rotary machine and a gas turbine including the same, and a blade installation method.

2. Description of the Background Art

Generally, a gas turbine is a combustion engine in which a mixture of air compressed by a compressor and fuel is combusted to produce a high temperature gas that drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are injected to the turbine. The injected combustion gases flow through vanes and blades to produce a rotational force that causes the turbine's rotor to spin.

On the other hand, a steam turbine includes a boiler that generates steam and a turbine that is rotated by high-temperature, high-pressure steam generated by the boiler. The turbine may include blades that are rotated by the high-temperature, high-pressure steam and vanes that guide a flow of the steam.

The turbines of the gas turbine and the steam turbine are composed of a rotary machine, which includes a rotor having blades and a stator having vanes.

A plurality of blades and vanes are alternately arranged around the rotor such that a row of blades and a row of vanes are arranged alternately in a longitudinal direction of the rotary machine to form a multi-stage structure.

The blade includes an airfoil, a platform part supporting the airfoil, and a root part formed at a lower portion of the platform part, wherein the root part is insertable into a groove formed in a rotor disk. A gap is formed between the root part and the groove in the rotor disk. The gap is formed in consideration of the assembly of the blade and the thermal expansion of components. The gap is formed by grinding lateral sides of the platform part.

However, such gaps may restrict the blades from being accurately engaged with neighboring blades, resulting in insufficient pitch width. Also, when the rotor is rotating at high speed, the blades are biased outward by centrifugal force, which prevents the blades from wobbling, but when the rotor is rotating at low speed, the centrifugal force is reduced, which may cause the blades to move against (i.e., toward) the rotor disk.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide an easily installable blade with a stable assembly that minimizes wobbling, and a rotary machine and a gas turbine including the same.

In an aspect of the present disclosure, there is provided a blade including: an airfoil having a leading edge and a trailing edge; a root part located at a lower portion of the airfoil; and a platform part located between the root part and the airfoil and having a first side surface and a second side surface spaced apart from each other, wherein the first side surface includes a first reference surface and a first inclined surface formed inclined to the first reference surface, and the second side surface includes a second reference surface and a second inclined surface formed inclined to the second reference surface.

The first reference surface and the second reference surface are perpendicular to an axial direction of the rotary machine and are parallel with a circumferential direction of the rotary machine.

The first inclined surface and the second inclined surface may be disposed to be staggered from each other.

The first inclined surface may be formed at a position corresponding to the second reference surface in a longitudinal direction of the platform part, and the second inclined surface may be formed at a position corresponding to the first reference surface in the longitudinal direction of the platform part.

The first reference surface may be disposed farther from the leading edge than the first inclined surface, and the second reference surface may be disposed closer to the trailing edge than the second inclined surface.

A first distance between the first reference surface and the second reference surface may be formed to be longer than a second distance between the first inclined surface and the second inclined surface.

A first angle defined by an extension of the first reference surface and the first inclined surface may be formed to be equal to a second angle defined by an extension of the second reference surface and the second inclined surface.

The first angle may be formed to be smaller than the second angle.

The platform part may be provided with an anti-collision surface at a leading end thereof.

In another aspect of the present disclosure, there is provided a rotary machine including: a rotatably installed rotor; and a fixed stator, wherein the rotor includes a rotor disk having an installation groove and a blade inserted into the rotor disk, the blade including: an airfoil having a leading edge and a trailing edge; a root part located at a lower portion of the airfoil; and a platform part located between the root part and the airfoil and having a first side surface and a second side surface spaced apart from each other, wherein the first side surface includes a first reference surface and a first inclined surface formed inclined to the first reference surface, and the second side surface includes a second reference surface and a second inclined surface formed inclined to the second reference surface.

The first reference surface and the second reference surface are perpendicular to an axial direction of the rotary machine and are parallel with a circumferential direction of the rotary machine.

The first inclined surface and the second inclined surface may be disposed to be staggered from each other.

The first inclined surface may be formed at a position corresponding to the second reference surface in a longitudinal direction of the platform part, and the second inclined surface may be formed at a position corresponding to the first reference surface in the longitudinal direction of the platform part.

The first reference surface may be disposed farther from the leading edge than the first inclined surface, and the second reference surface may be disposed closer to the trailing edge than the second inclined surface.

A first distance between the first reference surface and the second reference surface may be formed longer than a second distance between the first inclined surface and the second inclined surface.

In a further aspect of the present disclosure, there is provided a gas turbine including: a compressor configured to compress an externally introduced air; a combustor configured to mix the compressed air with fuel and combust an air-duel mixture; and a rotary machine rotated by combustion gases combusted in the combustor, the rotary machine including: a rotatably installed rotor; and a fixed stator, wherein the rotor includes a rotor disk having an installation groove and a blade inserted into the rotor disk, the blade including: an airfoil having a leading edge and a trailing edge; a root part located at a lower portion of the airfoil; and a platform part located between the root part and the airfoil and having a first side surface and a second side surface spaced apart from each other, wherein the first side surface includes a first reference surface and a first inclined surface formed inclined to the first reference surface, and the second side surface includes a second reference surface and a second inclined surface formed inclined to the second reference surface.

The first reference surface and the second reference surface are perpendicular to an axial direction of the rotary machine and are parallel with a circumferential direction of the rotary machine.

The first inclined surface and the second inclined surface may be disposed to be staggered from each other.

A first distance between the first reference surface and the second reference surface may be formed to be longer than a second distance between the first inclined surface and the second inclined surface.

In a further aspect of the present disclosure, there is provided a method of installing a blade, the method including a step of inserting the blade into an installation groove formed in the rotor disk; a step of aligning first and second inclined surfaces formed on a platform part of the blade to face an inner surface of the installation groove and moving the blade longitudinally into the installation groove; and a step of rotating the blade so that a first reference surface connected with the first inclined surface and a second reference surface connected with the second inclined surface face the inner surface of the installation groove.

In the blade movement step, the blade may be rotated so that the first inclined surface and the second inclined surface are spaced apart from the inner surface of the installation groove.

In the blade movement step, the blade may be rotated so that the first inclined surface and the second inclined surface are parallel to the inner surface of the installation groove and the first reference surface and the second reference surface are inclined to the inner surface of the installation groove.

In the blade rotation step, the blade may be rotated so that the first reference surface and the second reference surface are parallel to the inner surface of the installation groove and the first inclined surface and the second inclined surface are inclined to the inner surface of the installation groove.

According to the present disclosure, the blade has the first reference surface and the first inclined surface formed on the first side, and the second reference surface and the second inclined surface formed on the second side, so that the first and second reference surfaces or the first and second inclined surfaces can selectively abut against the installation groove of the rotor disk. Accordingly, the blade can be moved with the first and second inclined surfaces facing the inner surface of the installation groove, and the first and second reference surfaces can be fixed to abut against the inner surface of the installation groove.

DETAILED DESCRIPTION OF THE INVENTION

Figure 1:
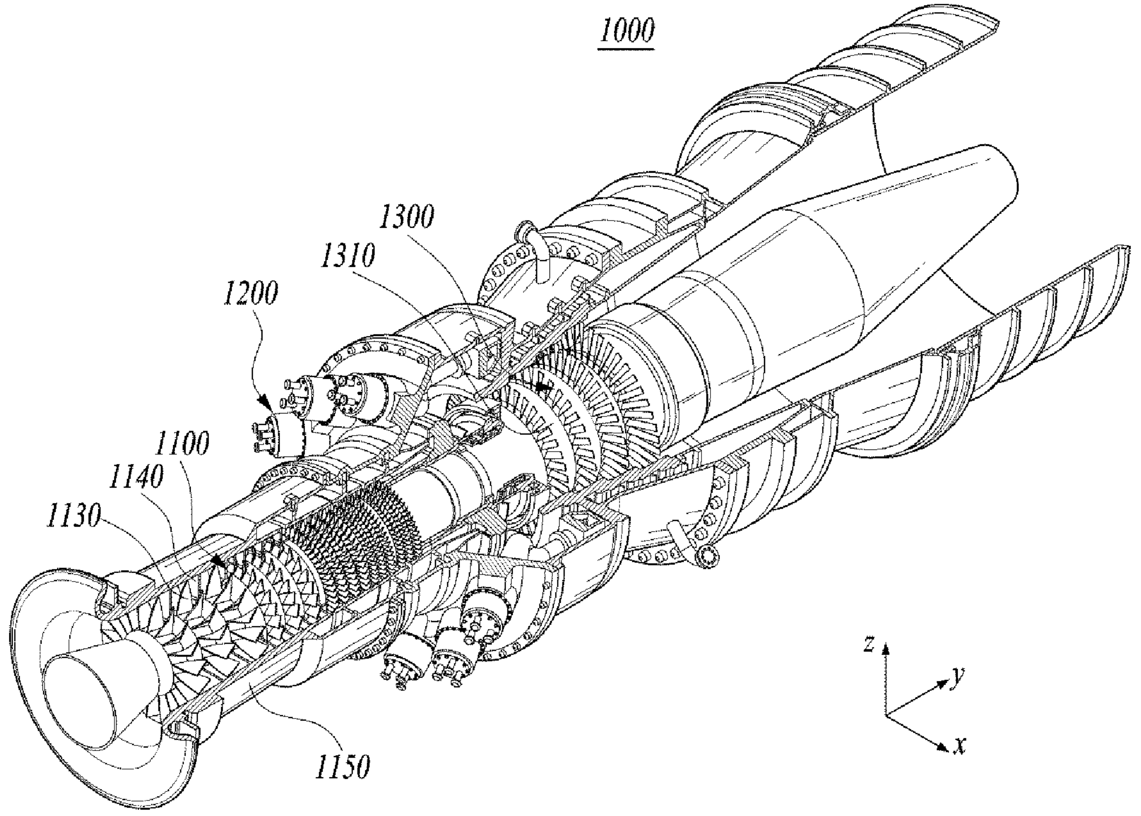
FIG. 1 is a view illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
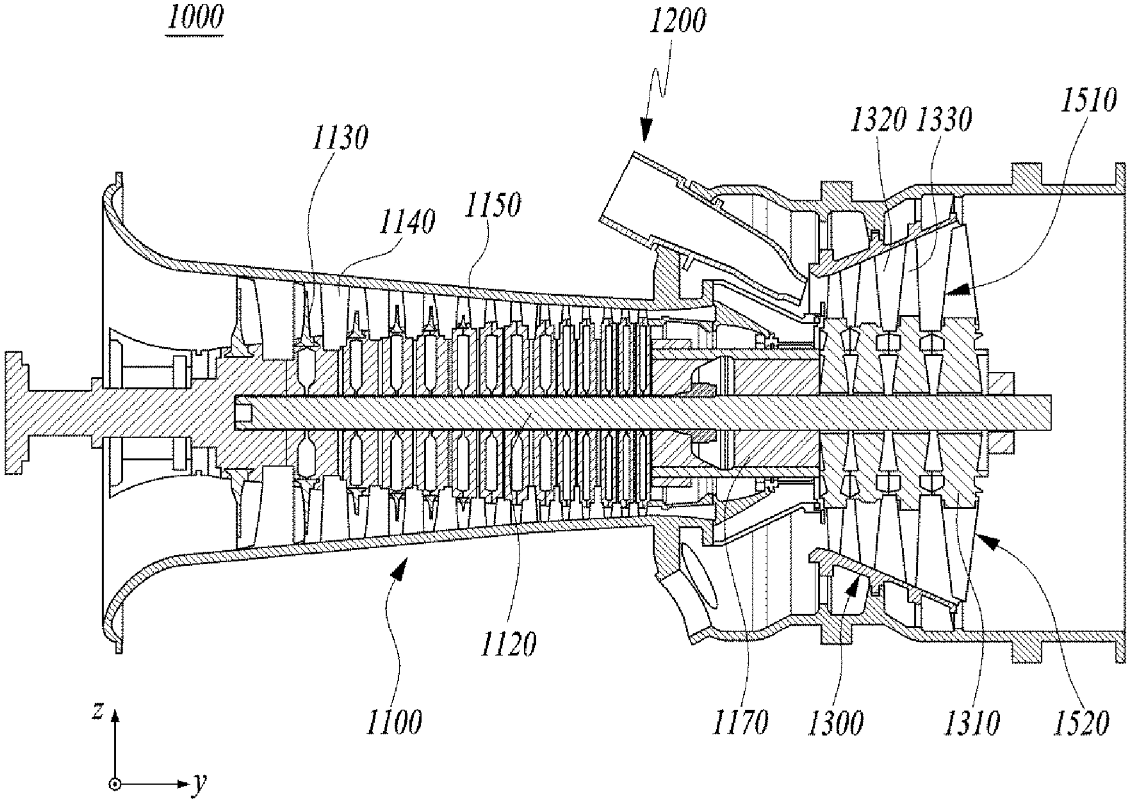
FIG. 2 is a longitudinal-sectional view illustrating a part of the gas turbine of FIG. 1.

FIG. 1 is a view illustrating the interior of a gas turbine according to an embodiment of the present disclosure, and FIG. 2 is a longitudinal-sectional view of the gas turbine of FIG. 1.

Referring to FIGS. 1 and 2, an ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion), and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, wherein the centrifugal compressor is applied to a small-scale gas turbine, whereas an axial compressor (especially, a multi-stage axial compressor) is applied to a large-scale gas turbine 1000 illustrated in FIGS. 1 and 2. It is because the large-scale gas turbine 1000 is required to compress a large amount of air. In this case, in the multi-stage axial compressor, the compressor blades 1130 rotate according to the rotation of the central tie rod 1120 and the rotor disks to compress the introduced air and move the compressed air to the compressor vanes 1140 on the rear stage. As the air passes through the blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 2, the rotary shaft of the compressor 1100 and the rotary shaft of the turbine 1300 may be directly connected by a torque tube 1170. In the case of the large-scale gas turbine 1000, almost half of the output produced by the turbine 1300 may be consumed to drive the compressor 1100.

The combustor 1200 may mix compressed air supplied from the outlet of the compressor 1100 with fuel and combust the air-fuel mixture at a constant pressure to produce a high-energy combustion gas. That is, the combustor 1200 mixes the inflowing compressed air with fuel and combusts the mixture to produce a high-temperature and high-pressure combustion gas. This combustion gas possesses a significant amount of energy, and its temperature is increased through an isobaric combustion process. By this process, the temperature of the combustion gas is raised to a temperature level that the combustor and turbine parts can withstand without being thermally damaged.

The combustor 1200 may include: a plurality of burners arranged in a housing formed in a cell shape and having a fuel injection nozzle, or the like; a combustor liner forming a combustion chamber; and a transition piece which is a connection between the combustor and the turbine.

The high-temperature and high-pressure combustion gas from the combustor 1200 is supplied to the turbine 1300. As the supplied high-temperature and high-pressure combustion gas is discharged, it expands and applies both impulse and impact forces to the blades 1330 of the turbine 1300. These forces generate rotational torque, which is then transferred to the compressor 1100 through the torque tube 1170. The excess power generated, beyond the power necessary to drive the compressor 1100, is utilized to drive a generator, or the like.

The turbine 1300 includes a rotary machine that is rotated by combustion gases. The rotary machine includes a rotor 1520 and a stator 1510. While this embodiment illustrates that the rotary machine is a part of a turbine section of a gas turbine, the present disclosure is not limited thereto. In other words, the rotary machine according to the present disclosure may be a part of a turbine section of a steam turbine.

The turbine 1300 may include a rotor disk 1310, a rotor 1520 including a plurality of blades 1330 disposed radially onto the rotor disk 1310, and a stator 1510 including fixed vanes 1320 that are nor rotatable.

Throughout the specification and the drawings, the direction y is a longitudinal or axial direction along the rotary shaft of the compressor 1100 and the rotary shaft of the turbine 1300. The direction z is a radial direction going from a radial center of the rotary shafts of the compressor 1100 and the turbine 1300 outward, such as toward the radial tip of the blades 1330 of the turbine 1300. The direction z is a circumferential direction along the rotation of the blades 1330 of the turbine 1300. Also, upstream and downstream directions in the axial direction y are defined based on the flow direction of the combustion gas in the turbine 1300.

Also, throughout the specification, the term “lower” or “inner” used with respect to components of the turbine 1300, such as blades 1330, means “radially inward” in the direction z and the term “upper” or “outer” means used in a similar context means “radially outward” in the direction z.

Figure 3:
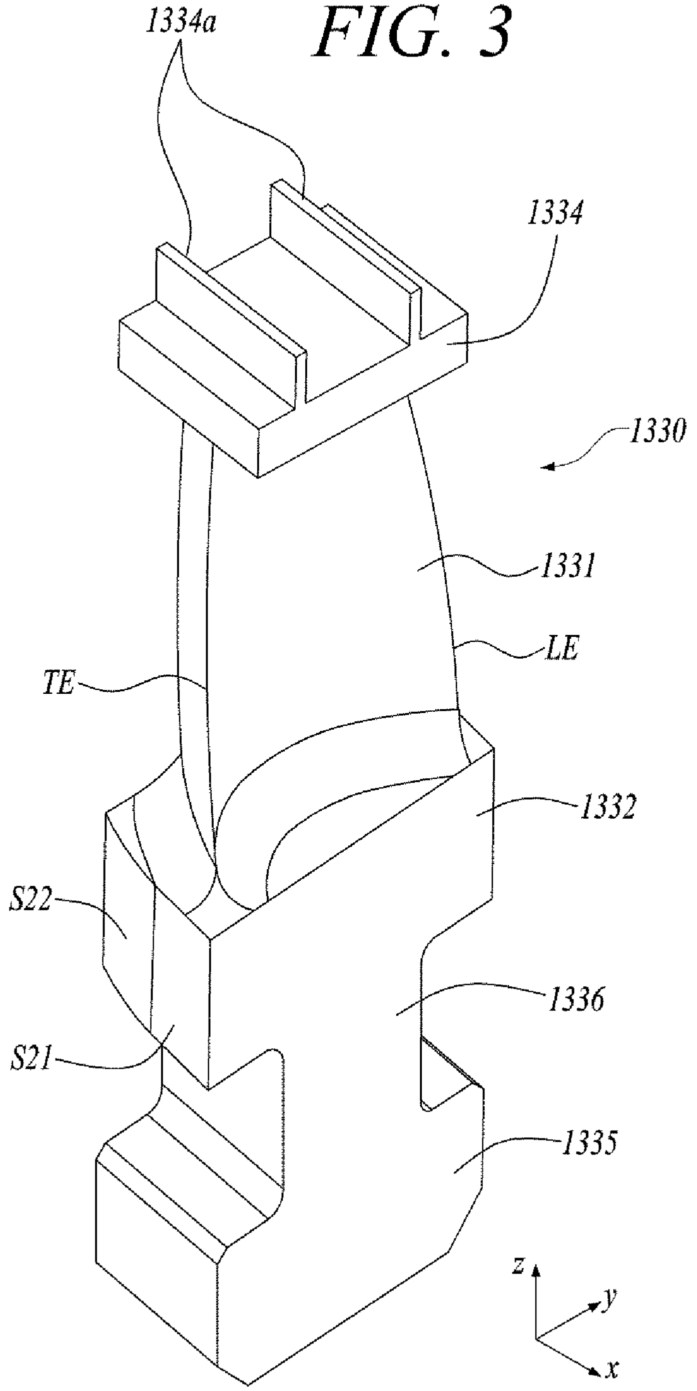
FIG. 3 is a view illustrating a blade inserted into a rotor disk according to a first embodiment of the present disclosure.
Figure 4:
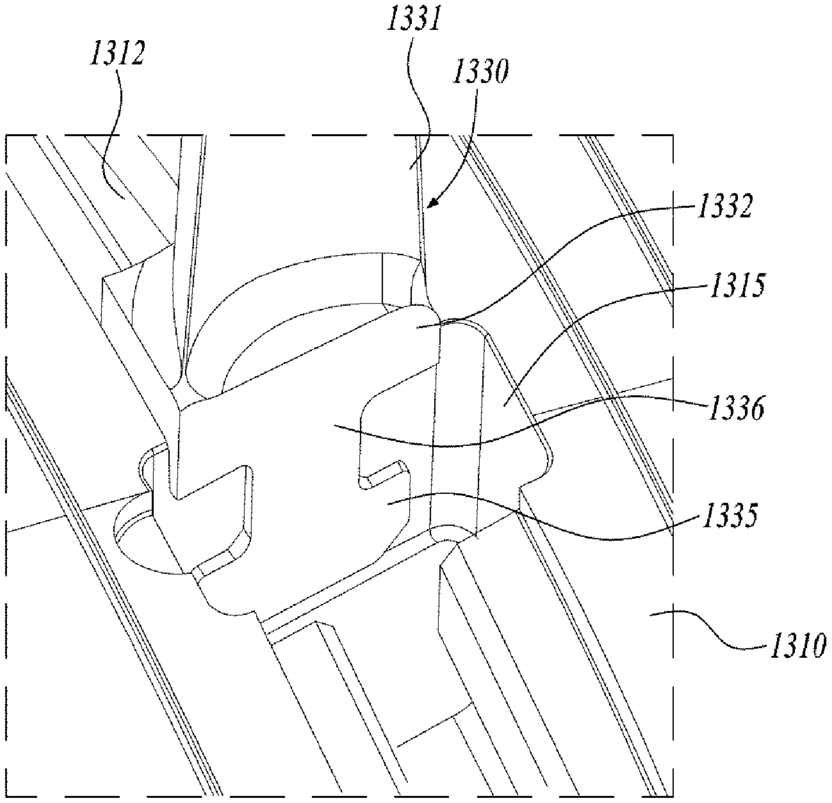
FIG. 4 is a perspective view illustrating a blade according to a first embodiment of the present disclosure.
Figure 5:
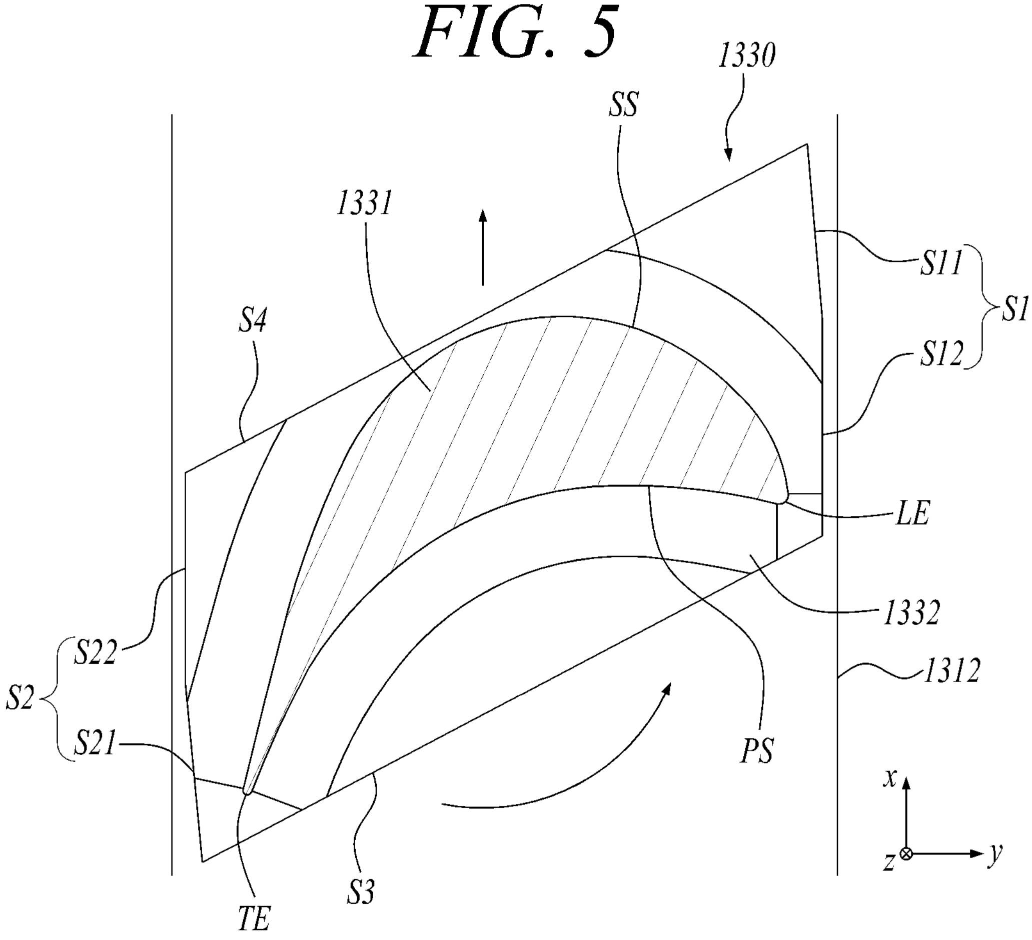
FIG. 5 is a view illustrating a disposition of the blade during a process of installing the blade into the rotor disk according to the first embodiment of the present disclosure.
Figure 6:
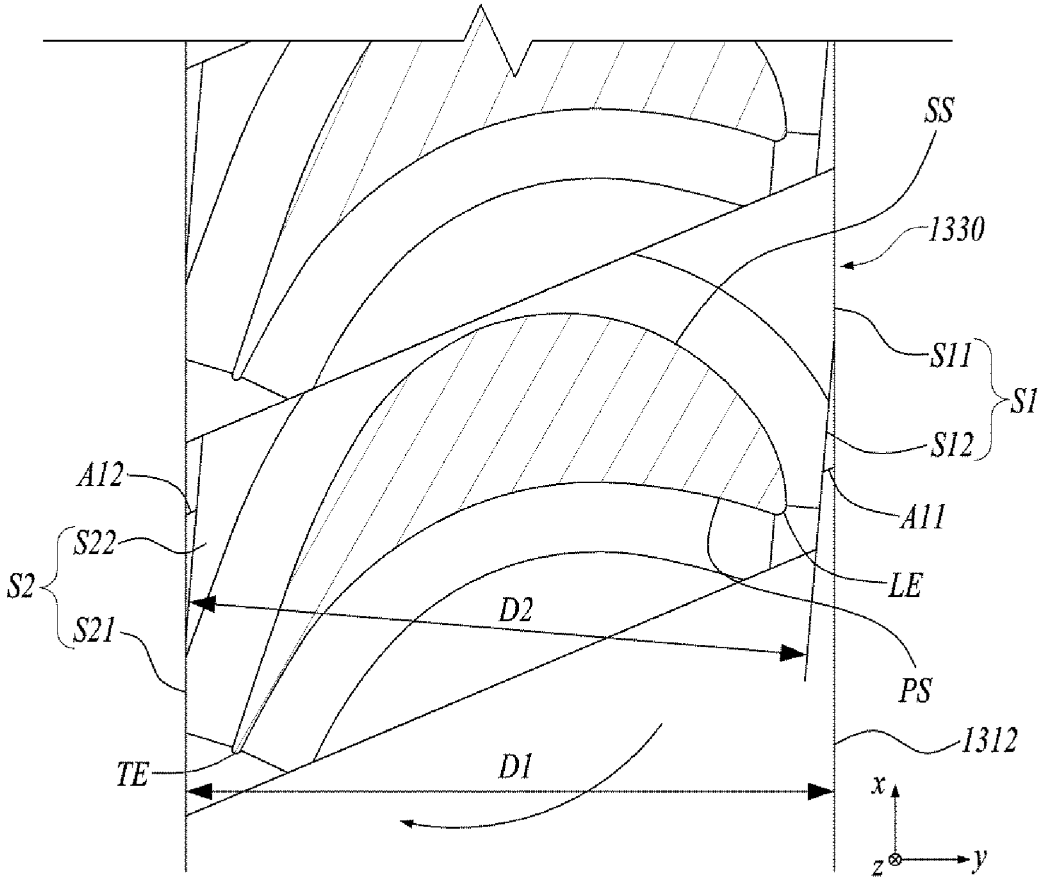
FIG. 6 is a perspective view illustrating the blade installed into the rotor disk so as to abut against a neighboring blade.

FIG. 3 is a view illustrating a blade inserted into a rotor disk according to a first embodiment of the present disclosure, FIG. 4 is a perspective view illustrating a blade according to a first embodiment of the present disclosure, FIG. 5 is a view illustrating a disposition of the blade during a process of installing the blade into the rotor disk according to the first embodiment of the present disclosure, and FIG. 6 is a perspective view illustrating the blade installed into the rotor disk so as to abut against a neighboring blade.

Referring to FIGS. 3 through 6, the rotor disk 1310 has a substantially disk-like shape and has a plurality of installation grooves 1312 formed on the outer circumference thereof. Each of the installation grooves 1312 is formed to have a curved portion. A lower portion of the blade 1330 is inserted into the installation groove 1312.

The installation grooves 1312 may be continuously formed along a circumferential direction of the rotor disk 1310. A platform part 1332, a shank part 1336, and a root part 1335 of the blade 1330 may be inserted into the installation groove 1312.

The blade 1330 may include an airfoil 1331, the platform part 1332 supporting the airfoil 1331 at a lower portion of the airfoil 1331, the root part 1335 formed on the lower side of the platform part 1332, the shank part 1336 connecting the platform part 1332 and the root part 1335, and a tip cover 1334 coupled to an upper portion of the airfoil 1331.

The airfoil 1331 is formed to have an optimized airfoil depending on the specifications of the gas turbine 1000, and has a leading edge LE disposed on the upstream side and a trailing edge TE disposed on the downstream side with respect to a flow direction of combustion gases. Cooling holes may be formed in the airfoil 1331 for cooling.

The airfoil 1331 also has a suction surface SS that is convexly curved to protrude outward, and a pressure surface PS that is concavely depressed toward the suction surface SS.

The platform part 1332 supports the airfoil 1331 at the lower portion of the airfoil 1331, and abuts against a platform part 1332 of a neighboring or adjacent blade 1330 at a lateral side thereof. Two adjacent platform parts 1332 may maintain a gap between the blades 1330.

The platform part 1332 may be in the shape of a plate having a thickness and in the shape of a multifaceted column in the radial direction z. The platform part 1332 may be inserted into the installation groove 1312. The platform part 1332 may be moved longitudinally into the installation groove within the space of the installation groove 1312.

The root part 1335 is formed at the lower portion of the platform part 1332, and the root part 1335 may be formed in the shape of a hexahedron or a multifaceted column. However, the present disclosure is not limited thereto, and the root part 1335 may be formed in a dovetail shape or a fir-tree shape. The root part 1335 is connected to the platform part 1332 via the shank part 1336, which may be shaped like a column.

The tip cover 1334 is located on the outer side of the airfoil 1331 and is in the form of a plate. Two protruding rails 1334*a* may be formed on an outer upper surface of the tip cover 1334. The tip covers 1334 may be circumferentially arranged to form a ring. Further, the tip cover 1334 may be inserted and rotated in a groove formed in a turbine casing.

As illustrated in FIGS. 3 and 4, the installation grooves 1312 formed in the rotor disk 1310 are continuously formed circumferentially forming a ring shape, and a plurality of turbine blades 1330 may be inserted into the one single installation groove 1312. The installation grooves 1312 may also be connected with wide insertion groove 1315 formed for insertion of the turbine blade 1330. The turbine blades 1330 may be inserted through the wide insertion groove 1315, moved along the installation grooves 1312, and locked in a predetermined position. One turbine blade 1330 may be locked in a predetermined position when the turbine blade 1330 is moved circumferentially and abut an adjacent turbine blade 1330.

The platform part 1332 may include a first side surface S1 in the same direction of the leading edge LE and a second side surface S2 in the same direction of the trailing edge TE. Here, the first side surface S1 and the second side surface S2 can be opposite sides facing each other. The first side surface S1 may be a surface formed being parallel to the radial direction z and facing the upward direction and the second side surface S2 may be a surface formed being parallel to the radial direction z and facing the downward direction, when the upward and the downward direction being are defined in the flow direction of the combustion gas in the turbine 1300.

The platform part 1332 may have four side surfaces, two of which may abut against the installation groove 1312 and the other two of which may abut against platform parts 1332 of two neighboring blades 1330. The two surfaces abutting against inner surfaces of the installation groove 1312 are the first side surface S1 and the second side surface S2.

Among the two side surfaces of the platform part 1332 abutting adjusting blades 1330, the one side surface facing the suction surface SS of the adjusting blade 1330 may be referred to as a pressure side surface S3 of the platform part 1332 and the other side surface facing the pressure surface of the other adjusting blade 1330 may be referred to as a suction side surface S4 of the platform part 1332.

The first side surface S1 may include a first reference surface S11 and a first inclined surface S12, the first inclined surface S12 being formed to be inclined with respect to the first reference surface S11. Here, the first reference surface S11 may be a surface perpendicular to the axial direction of the turbine and parallel to the circumferential direction x when the blade 1330 is installed and locked onto the rotor disk 1310, but the present disclosure is not limited thereto. The first inclined surface S12 may be with respect the first reference surface S11 while both the first reference surface S11 and the first inclined surface S12 remain parallel to the radial direction z when the blade 1330 is installed and locked onto the rotor disk 1310.

The first inclined surface S12 may be formed to be inclined at a predetermined angle with respect to the first reference surface S11, and a first inclination angle A11 defined by the first inclined surface S12 with respect to an extension of the first reference surface S11 may range from 0.5 degrees to 30 degrees.

The first inclined surface S12 extends from the first reference surface S11 toward the leading edge LE, and is disposed closer to the leading edge LE than the first reference surface S11. The first reference surface S11 may extend from the first inclined surface S12 toward a convex outer end of the suction surface SS.

Also, the first inclined surface S12 extends from the first reference surface S11 toward the pressure side surface S3 of the platform part 1332 and the first reference surface S11 extends from the first inclined surface S12 toward the suction side surface S4 of the platform 1332.

Furthermore, the first reference surface S11 is closer to the suction side surface S4 of the platform 1332 than the first inclined surface S12 and the first inclined surface S12 is closer to the pressure side surface S3 of the platform 1332 than the first reference surface S11.

The second side surface S2 may include a second reference surface S21 and a second inclined surface S22, the second inclined surface S22 being inclined with respect to the second reference surface S21. The second inclined surface S22 is inclined with respect to the second reference surface S21 at a second inclination angle A12, which may range from 0.5 degrees to 30 degrees.

The second reference surface S21 may be a surface perpendicular to the axial direction y of the turbine and parallel to the circumferential direction x when the blade 1330 is installed and locked onto the rotor disk 1310. The second inclined surface S22 may be with respect to the second reference surface S21 while both the second reference surface S21 and the second inclined surface S22 remain parallel to the radial direction when the blade 1330 is installed and locked on to the rotor disk 1310.

The second inclined surface S22 may extend from the second reference surface S21 towards the convex outer end of the suction surface SS. The second reference surface S21 is disposed closer to the trailing edge TE than the second inclined surface S22.

Also, the second inclined surface S22 extends from the second reference surface S21 toward the suction side surface S4 of the platform part 1332 and the second reference surface S21 extends from the second inclined surface S22 toward the pressure side surface S3 of the platform 1332.

Furthermore, the second reference surface S21 is closer to the pressure side surface S3 of the platform 1332 than the second inclined surface S22 and the second inclined surface S22 is closer to the suction side surface S4 of the platform 1332 than the second reference surface S21.

The first inclined surface S12 and the second inclined surface S22 are disposed to stagger each other, such that the first inclined surface S12 may be formed at a position corresponding to the second reference surface S21 in the longitudinal direction (y-axis direction) of the platform part 1332, and the second inclined surface S22 may be formed at a position corresponding to the first reference surface S11 in the longitudinal direction (y-axis direction) of the platform part 1332.

In other words, the first inclined surface S12 and the second inclined surface S22 are disposed to stagger each other, such that the first inclined surface S12 and the second reference surface S21 are disposed closer to the pressure side surface S3 of the platform part 1332, and the second inclined surface S22 and the first reference surface S11 are disposed closer to the suction side surface S4 of the platform part 1332.

That is, the first reference surface S11 and the second inclined surface S22 may be connected to the pressure side surface S3 in the platform part 1332, and the second reference surface S21 and the first inclined surface S12 may be connected to the suction side surface S4 in the platform part 1332.

According to an embodiment, the first inclination angle A11 and the second inclination angle A12 may be equal to each other, such that the first reference surface S11 and the second reference surface S21 are formed to be parallel to each other, and the first inclination surface S12 and the second inclination surface S22 are formed to be parallel to each other.

According to another embodiment, the second inclination angle A12 may be formed to be larger than the first inclination angle A11 by 10% to 50%. When the second inclination angle A12 is formed to be larger than the first inclination angle A11, a larger gap between two adjacent trailing edges of the airfoils 1331 may be formed to allow the blade 1330 to be moved more easily.

According to an embodiment, a first distance D1 between the first reference surface S11 and the second reference surface S21 may be formed to be larger than a second distance D2 between the first inclined surface S12 and the second inclined surface S22. Accordingly, when the first inclined surface S12 and the second inclined surface S22 abut against the inner surface of the installation groove 1312, the blade 1330 may be easily moved for the assembly (i.e., installation) and/or disassembly of the blades 1330. The first distance D1 may be equal to the width of the installation groove 1312 in the axial direction.

Hereinafter, a method of installing the blade 1330 according to the first embodiment of the present disclosure will be described.

Figure 7:
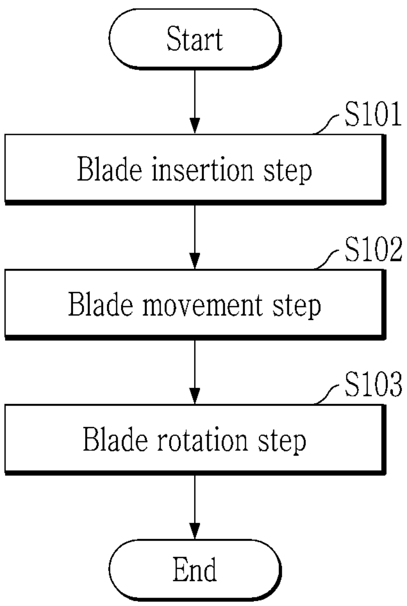
FIG. 7 is a flowchart illustrating a method of installing the blade according to the first embodiment of the present disclosure.

FIG. 7 is a flowchart illustrating a method of installing the blade when the blade is formed according to the first embodiment of the present disclosure.

Referring to FIGS. 5 through 7, a blade installation method according to the present embodiment may include a blade insertion step S101, a blade movement step S102, and a blade rotation step S103.

The blade insertion step S101 is performed such that the blade 1330 is inserted into the installation groove 1312 such that the root part 1335, the shank part 1336, and the platform part 1332 formed on the lower side of the blade 1330 are inserted into the installation groove 1312 through the insertion groove 1315.

The blade movement step S102 is performed such that the blade 1330 is moved longitudinally in the installation groove 1312 after the first inclined surface S12 and the second inclined surface S22 are in a position aligned to face, in other words, are parallel to, the inner surface of the installation groove 1312. When the blade 1330 is rotated to be in a position such that the first inclined surface S12 and the second inclined surface S22 face, in other words, are parallel to, the inner surface of the installation groove 1312, the length of the blade 1330 in the longitudinal direction becomes the second distance D2 and is shorter than the width of the installation groove 1312 in the axial direction, thereby allowing an easier movement of the blade in the installation groove 1312.

In the blade movement step S102, the blade 1330 may be rotated so that the first inclined surface S12 and the second inclined surface S22 are parallel to the inner surface of the installation groove 1312, and the first reference surface S11 and the second reference surface S21 are inclined to the inner surface of the installation groove 1312. Further, in the blade movement step S102, the blade 1330 may be rotated so that the first inclined surface S12 and the second inclined surface S22 are spaced apart from the inner surface of the installation groove 1312. It is possible because when the first inclined surface S12 and the second inclined surface S22 are parallel to the inner surface of the installation groove 1312, the length of the platform part 1332 in the axial direction becomes the second distance D2 which is smaller than the width of the installation groove 1312 in the axial direction.

The blade rotation step S103 is performed such that the blade 1330 is rotated so that the first reference surface S11 and the second reference surface S21 abut against (i.e., closely contact) the inner surface of the installation groove 1312 after the blade 1330 is moved to a preset position. Further, in the blade rotation step S103, the blade 1330 may be rotated so that the first reference surface S11 and the second reference surface S21 are parallel to the inner surface of the installation groove 1312, and the first inclined surface S12 and the second inclined surface S22 are inclined to the inner surface of the installation groove 1312. In other words, the blade rotation step S103 may be performed such that the length of the platform part 1332 in the axial direction becomes the first distance D1. When the width of the installation groove 1312 is equal to the first distance D1, by the blade rotation step S103, both the first reference surface S11 and the second reference surface S21 becomes parallel to and in close contact with the inner surface of the installation groove 1312.

Accordingly, the first reference surface S11 and the second reference surface S21 of the platform part 1332 may be firmly supported by the inner surface of the installation groove 1312 through abutment thereto. In the blade rotation step S103, the blade 1330 is rotated to pre-load the tip cover 1334, and a rotational force generated by the pre-load may bias the first reference surface S11 and the second reference surface S21 toward the inner surface of the installation groove 1312.

Upon rotation of the turbine 1300, a rotational force is generated on the blades 1330, and the rotational force causes the first reference surface S11 and the second reference surface S21 to abut against the installation groove 1312. Accordingly, the blade 1330 may be prevented from wobbling even when the first inclined surface S12 and the second inclined surface S22 are formed. Further, the blades 1330 may abut against neighboring blades 1330, which prevents the blades from rotating.

Further, the rotation of the blades 1330 may uniformly apply a predetermined biasing force to the tip covers 1334 that abut against each other. Furthermore, the manufacturing efficiency is improved by eliminating the need for a gap formation process, such as grinding, for installation of the blade 1330. Additionally, since no gap is formed, the blades 1330 may be prevented from experiencing wobbling even during low speed operation.

Hereinafter, a blade according to a second embodiment of the present disclosure will be described.

Figure 8:
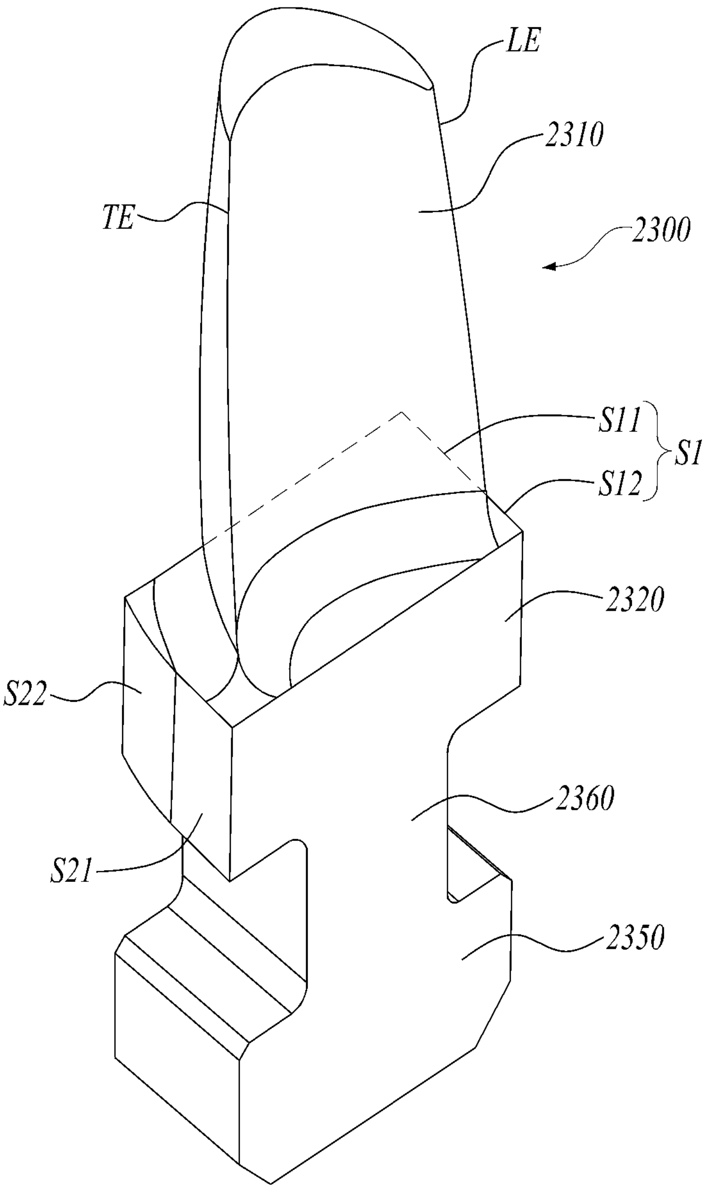
FIG. 8 is a perspective view illustrating a blade according to a second embodiment of the present disclosure.

FIG. 8 is a perspective view illustrating a blade according to a second embodiment of the present disclosure.

Referring to FIG. 8, the blade 2300 according to this embodiment may include an airfoil 2310, a platform part 2320 supporting the airfoil 2310 at a lower portion of the airfoil 2310, a root part 2350 formed on a lower side of the platform part 2320, and a shank part 2360 connecting the platform part 2320 and the root part 2350. The blade 2300 according to the second embodiment does not have a tip cover.

Meanwhile, the platform part 2320 includes a first side surface S1 in the same direction of the leading edge LE and a second side surface S2 in the same direction of the trailing edge TE, wherein the first side surface S1 may include a first reference surface S11 and a first inclined surface S12 formed to be inclined with respect to the first reference surface S11. Further, the second side surface S2 may include a second reference surface S21 and a second inclined surface S22 formed inclined with respect to the second reference surface S21.

Other features of the blade according to the second embodiment are similar to the first embodiment and, thus, to avoid repetition, a detailed description of those features will be omitted.

The following describes a blade according to a third embodiment of the present disclosure.

Figure 9:
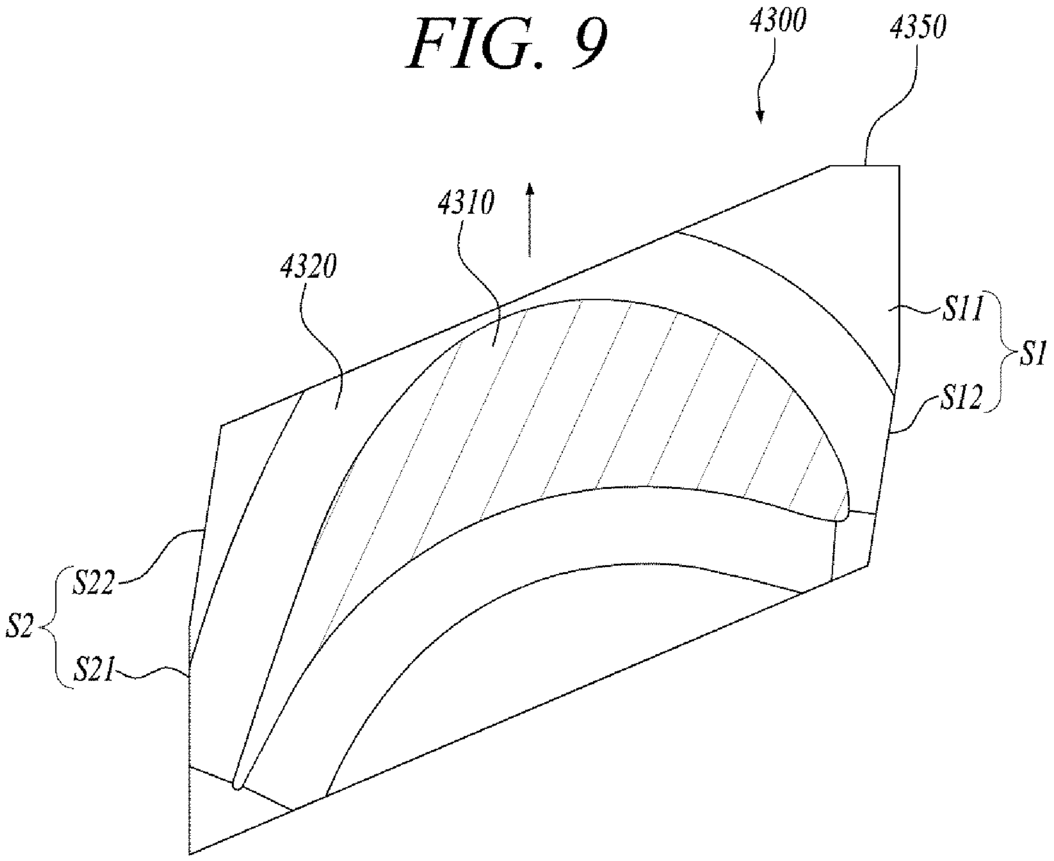
FIG. 9 is a cross-sectional view illustrating a blade according to a third embodiment of the present disclosure.

FIG. 9 is a cross-sectional view illustrating a blade according to a third embodiment of the present disclosure.

Referring to FIG. 9, a platform part 4320 of the blade 4300 according to this third embodiment supports the airfoil 4310 at a lower portion of the airfoil 4310 and may include a first side surface S1 in the same direction with a leading edge LE and a second side surface S2 in the same direction with a trailing edge TE.

The first side surface S1 may include a first reference surface S11 and a first inclined surface S12 formed inclined with respect to the first reference surface S11. Further, the second side surface S2 may include a second reference surface S21 and a second inclined surface S22 formed inclined with respect to the second reference surface S21.

According to third embodiment, an anti-collision surface 4350 is formed at a leading end of the platform part 4320 with respect to the movement direction of the blade 4300 so as to be perpendicular to the movement direction. The anti-collision surface 4350 may be formed by cutting a part of the upstream end of the suction side surface of the platform 43320. The anti-collision surfaces 4350 prevent the platform parts 4320 from being damaged by a collision of neighboring blades 4300 during the movement process.

While the embodiments of the present disclosure have been described, it will be apparent to those skilled in the art that various modifications and variations can be made to the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A blade for a rotary machine, the blade comprising:
an airfoil having a leading edge and a trailing edge;
a root part located at a lower portion of the airfoil; and
a platform part located between the root part and the airfoil and having a first side surface and a second side surface spaced apart from each other,
wherein the first side surface comprises a first reference surface and a first inclined surface formed inclined to the first reference surface, and the second side surface comprises a second reference surface and a second inclined surface formed inclined to the second reference surface,
wherein a first angle defined by an extension of the first reference surface and the first inclined surface is formed to be smaller than a second angle defined by an extension of the second reference surface and the second inclined surface,
wherein the second reference surface is disposed closer to the trailing edge than the first reference surface,
wherein the first reference surface and the second reference surface being perpendicular to an axial direction of the rotary machine and being parallel with a circumferential direction of the rotary machine,
wherein the first inclined surface and the second inclined surface are disposed to be staggered from each other,
wherein the first inclined surface is formed at a position corresponding to the second reference surface in a longitudinal direction of the platform part, and the second inclined surface is formed at a position corresponding to the first reference surface in the longitudinal direction of the platform part.

2. The blade according to claim 1, wherein the first reference surface is disposed father from the leading edge than the first inclined surface, and the second reference surface is disposed closer to the trailing edge than the second inclined surface.

3. The blade according to claim 1, wherein a first distance between the first reference surface and the second reference surface is formed to be longer than a second distance between the first inclined surface and the second inclined surface.

4. The blade according to claim 1, wherein the platform part is provided with an anti-collision surface at a leading end thereof.

5. A rotary machine comprising:

a rotatably installed rotor; and a fixed stator, wherein the rotor comprises a rotor disk having an installation groove and a blade inserted into the rotor disk, the blade comprising:

an airfoil having a leading edge and a trailing edge;

a root part located at a lower portion of the airfoil; and a platform part located between the root part and the airfoil and having a first side surface and a second side surface spaced apart from each other, wherein the first side surface comprises a first reference surface and a first inclined surface formed inclined to the first reference surface, and the second side surface comprises a second reference surface and a second inclined surface formed inclined to the second reference surface, wherein a first angle defined by an extension of the first reference surface and the first inclined surface is formed to be smaller than a second angle defined by an extension of the second reference surface and the second inclined surface, wherein the second reference surface is disposed closer to the trailing edge than the first reference surface, wherein the first reference surface and the second reference surface being perpendicular to an axial direction of the rotary machine and being parallel with a circumferential direction of the rotary machine, wherein the first inclined surface and the second inclined surface are disposed to be staggered from each other, wherein the first inclined surface is formed at a position corresponding to the second reference surface in a longitudinal direction of the platform part, and the second inclined surface is formed at a position corresponding to the first reference surface in the longitudinal direction of the platform part.

6. The rotary machine according to claim 5, wherein the first reference surface is disposed father from the leading edge than the first inclined surface, and the second reference surface is disposed closer to the trailing edge than the second inclined surface.

7. The rotary machine according to claim 5, wherein a first distance between the first reference surface and the second reference surface is formed longer than a second distance between the first inclined surface and the second inclined surface.

8. A gas turbine comprising:

a compressor configured to compress an externally introduced air;

a combustor configured to mix the compressed air with fuel and combust an air-fuel mixture; and a rotary machine rotated by combustion gases combusted in the combustor, the rotary machine comprising:

a rotatably installed rotor; and a fixed stator, wherein the rotor comprises a rotor disk having an installation groove and a blade inserted into the rotor disk, the blade comprising:

an airfoil having a leading edge and a trailing edge;

a root part located at a lower portion of the airfoil; and a platform part located between the root part and the airfoil and having a first side surface and a second side surface spaced apart from each other, wherein the first side surface comprises a first reference surface and a first inclined surface formed inclined to the first reference surface, and the second side surface comprises a second reference surface and a second inclined surface formed inclined to the second reference surface, wherein a first angle defined by an extension of the first reference surface and the first inclined surface is formed to be smaller than a second angle defined by an extension of the second reference surface and the second inclined surface, wherein the second reference surface is disposed closer to the trailing edge than the first reference surface, wherein the first reference surface and the second reference surface being perpendicular to an axial direction of the rotary machine and being parallel with a circumferential direction of the rotary machine, wherein the first inclined surface and the second inclined surface are disposed to be staggered from each other, wherein the first inclined surface is formed at a position corresponding to the second reference surface in a longitudinal direction of the platform part, and the second inclined surface is formed at a position corresponding to the first reference surface in the longitudinal direction of the platform part.

9. The gas turbine according to claim 8, wherein a first distance between the first reference surface and the second reference surface is formed to be longer than a second distance between the first inclined surface and the second inclined surface.

* * * * *